US 8,606,184 B1

(12) United States Patent
Luthra

(10) Patent No.: US 8,606,184 B1
(45) Date of Patent: Dec. 10, 2013

(54) COEXISTENCE MESSAGE PROCESSING MECHANISM FOR WIRELESS DEVICES

(75) Inventor: Manev Luthra, Santa Clara, CA (US)

(73) Assignee: QUALCOMM Incorporated, San Diego, CA (US)

(*) Notice: Subject to any disclaimer, the term of this patent is extended or adjusted under 35 U.S.C. 154(b) by 539 days.

(21) Appl. No.: 12/633,150

(22) Filed: Dec. 8, 2009

(51) Int. Cl.
  *H04B 1/00* (2006.01)
  *H04B 15/00* (2006.01)
  *H04B 1/04* (2006.01)
  *H04B 1/10* (2006.01)
  *H04B 17/00* (2006.01)
  *H04B 7/00* (2006.01)

(52) U.S. Cl.
  USPC ....... 455/63.1; 455/114.2; 455/296; 455/501; 455/67.13; 455/41.2; 370/229

(58) Field of Classification Search
  USPC .................................................. 455/63.1
  See application file for complete search history.

(56) References Cited

U.S. PATENT DOCUMENTS

| | | | |
|---|---|---|---|
| 7,046,649 B2 | 5/2006 | Awater et al. | |
| 7,151,764 B1 | 12/2006 | Heinonen et al. | |
| 7,460,543 B2 | 12/2008 | Malik et al. | |
| 7,568,034 B1 | 7/2009 | Dulitz et al. | |
| 7,814,224 B2 | 10/2010 | Maruyama et al. | |
| 2002/0136233 A1* | 9/2002 | Chen et al. | 370/445 |
| 2004/0156367 A1 | 8/2004 | Albuquerque et al. | |
| 2004/0242258 A1* | 12/2004 | Kim | 455/522 |
| 2005/0185651 A1 | 8/2005 | Rinne | |
| 2006/0030266 A1 | 2/2006 | Desai et al. | |
| 2006/0221825 A1 | 10/2006 | Okano | |
| 2006/0292986 A1 | 12/2006 | Bitran et al. | |
| 2007/0021066 A1 | 1/2007 | Dravida et al. | |
| 2007/0135162 A1 | 6/2007 | Banerjea et al. | |
| 2007/0165754 A1 | 7/2007 | Kiukkonen et al. | |
| 2007/0183338 A1 | 8/2007 | Singh et al. | |
| 2007/0275746 A1* | 11/2007 | Bitran | 455/509 |
| 2008/0095124 A1 | 4/2008 | Ramos et al. | |
| 2008/0102885 A1 | 5/2008 | Tu et al. | |
| 2008/0123682 A1 | 5/2008 | Yackoski et al. | |
| 2008/0130603 A1 | 6/2008 | Wentink et al. | |
| 2008/0240139 A1 | 10/2008 | Kodialam et al. | |
| 2008/0259846 A1 | 10/2008 | Gonikberg et al. | |
| 2009/0010152 A1 | 1/2009 | Ofek et al. | |

(Continued)

OTHER PUBLICATIONS

Golmie, N.; Chevrollier, N.; Rebala, O.; , "Bluetooth and WLAN coexistence: challenges and solutions," Wireless Communications, IEEE , vol. 10, No. 6, pp. 22-29, Dec. 2003 doi: 10.1109/MWC.2003. 1265849 URL: http://ieeexplore.ieee.org/stamp/stamp.jsp?tp=&arnumber=1265849&isnumber=28311.*

(Continued)

*Primary Examiner* — Temesgh Ghebretinsae
*Assistant Examiner* — Devan Sandiford
(74) *Attorney, Agent, or Firm* — DeLizio Gilliam, PLLC

(57) ABSTRACT

Wireless radio devices that communicate in close proximity to each other typically suffer from interference. Such interference between collocated wireless radio devices can lead to degradation in performance of either/both the wireless radio devices. Functionality can be implemented to schedule communications of the wireless radio devices so as to avoid interference between the two wireless radio devices. Coexistence messages can be exchanged, via a message based coexistence interface, between the wireless radio devices. By transmitting information such as received signal strength information, power, link information, scheduling information for a scheduling table, communication schedules, communication priorities, etc. in the coexistence message, interference between the wireless radio devices can be minimized.

28 Claims, 8 Drawing Sheets

(56) References Cited

U.S. PATENT DOCUMENTS

| | | |
|---|---|---|
| 2009/0137206 A1 | 5/2009 | Sherman et al. |
| 2009/0247217 A1 | 10/2009 | Hsu et al. |
| 2009/0252095 A1 | 10/2009 | Lu et al. |
| 2009/0258607 A1 | 10/2009 | Beninghaus et al. |
| 2009/0298522 A1 | 12/2009 | Chaudhri et al. |
| 2010/0284380 A1 | 11/2010 | Banerjee et al. |
| 2011/0009060 A1 | 1/2011 | Hsu et al. |
| 2011/0268024 A1 | 11/2011 | Jamp et al. |

OTHER PUBLICATIONS

"CSR Bluetooth and IEEE 802.11b Co-Existence Solution", *CSR BlueCore 2-External* Feb. 2003, 20 pages.

"CSR Co-Existence Scheme Definition", *BlueCore 3-External* Nov. 2003, 8 pages.

"How 802.11b/g WLAN and Bluetooth Can Play", *Philips* Sep. 2005, 5 pages.

"Three Wire Interface", *Infineon Technologies* Functional Design Document Oct. 4, 2004, 6 pages.

"Wi-Fi and Bluetooth—Interference Issues", *Hewlett Packard* Jan. 2002, 6 pages.

Bluetooth, "Bluetooth Core Specification Version 3.0", vol. 2, *part B: Core System Package* [*Controller volume*] http://www.bluetooth.com/Bluetooth/Technology/Building/Specifications/ (Obtained from the Internet Nov. 4, 2009) Apr. 21, 2009, pp. 59-206.

U.S. Appl. No. 12/236,604, filed Sep. 24, 2008, Nam, Kyungwan et al.

U.S. Appl. No. 12/620,270, filed Nov. 17, 2009, Hirsch, Olaf et al.

U.S. Appl. No. 12/639,207, filed Dec. 16, 2009, Luthra, Manev.

U.S. Appl. No. 12/651,871, filed Jan. 4, 2010, Husted, Paul J.

International Search Report and Written Opinion—PCT/US2011/045888—ISA/EPO—Dec. 13, 2011, 7 pages.

"U.S. Appl. No. 12/620,270 Office Action", Dec. 8, 2011, 8 pages.

U.S. Appl. No. 12/846,427, filed Jul. 29, 2010, Jamp, Joe I.

"U.S. Appl. No. 12/236,604 Office Action", Jun. 29, 2011, 39 pages.

U.S. Appl. No. 12/846,427 Office Action Oct. 10, 2012, 20 Pages.

U.S. Appl. No. 12/639,207 Final Office Action Nov. 23, 2012, 29 pages.

"U.S. Appl. No. 12/639,207 Office Action", Apr. 24, 2012, 31 pages.

"PCT Application No. PCT/US11/45888 International Preliminary Report on Patentability", Jun. 28, 2012, 7 pages.

\* cited by examiner

COEXISTENCE MESSAGE PROCESSING MECHANISM FOR WIRELESS DEVICES

BACKGROUND

Embodiments of the inventive subject matter generally relate to the field of wireless communication and, more particularly, to enabling coexistence using a message based coexistence interface.

When wireless devices are in close proximity to each other, communication from one wireless device may interfere with communication from the other wireless device. For example, when short range wireless communications devices such as BLUETOOTH® (hereinafter, "Bluetooth") and wireless local area network (WLAN) devices operate in close proximity to each other, the radio protocol of one device can interfere with the radio protocol of the other device. The Bluetooth device can use adaptive frequency hopping (AFH) techniques to avoid frequencies on which a WLAN transmission is detected. Packet traffic arbitration (PTA) wires may also be used to provide dynamic information to the wireless devices to prevent the Bluetooth and WLAN devices from transmitting at the same time.

SUMMARY

Various embodiments for enabling coexistence using a message based coexistence interface are disclosed. In one embodiment, a coexistence message is received from a first wireless network device of a communication system across a message based coexistence interface. The message based coexistence interface is an interface between the first wireless network device and a second wireless network device of the communication system. A message tag of the coexistence message that identifies content of the coexistence message is determined. It is determined whether a descriptor associated with the message tag is available. The descriptor indicates how the coexistence message that comprises the message tag should be processed. In response to determining that the descriptor associated with the message tag is available, the coexistence message is processed in accordance with the descriptor and the message tag.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to exchanging messages via a message based coexistence interface (MCI) to enable coexistence between WLAN and Bluetooth devices, in other embodiments communication may be scheduled for other wireless standards and devices, e.g., WiMAX, ZigBee®, Wireless USB devices, etc. In other instances, well-known instruction instances, protocols, structures, and techniques have not been shown in detail in order not to obfuscate the description.

Interference between wireless radio devices (e.g., a Bluetooth device and a WLAN device) may be caused when the wireless radio devices are collocated on a common system and/or are communicating (e.g., transmitting or receiving signals) in close proximity to each other. Such interference between the collocated wireless radio devices can result in performance degradation. In some embodiments, communications of the wireless radio devices can be scheduled so that the communication of one radio device does not interfere with the communication of the other radio device. This can be facilitated by exchange of coexistence messages between the wireless radio devices across a message based coexistence interface (MCI). Transmitting the coexistence messages across the MCI enables transfer of a richer set of information such as received signal strength information (RSSI), transmit power level, link information, scheduling information for a scheduling table, communication schedules, communication priorities, etc. without being limited by a number of wires connecting the wireless radio devices and a type of information that can be transmitted along the wires.

Figure 1:
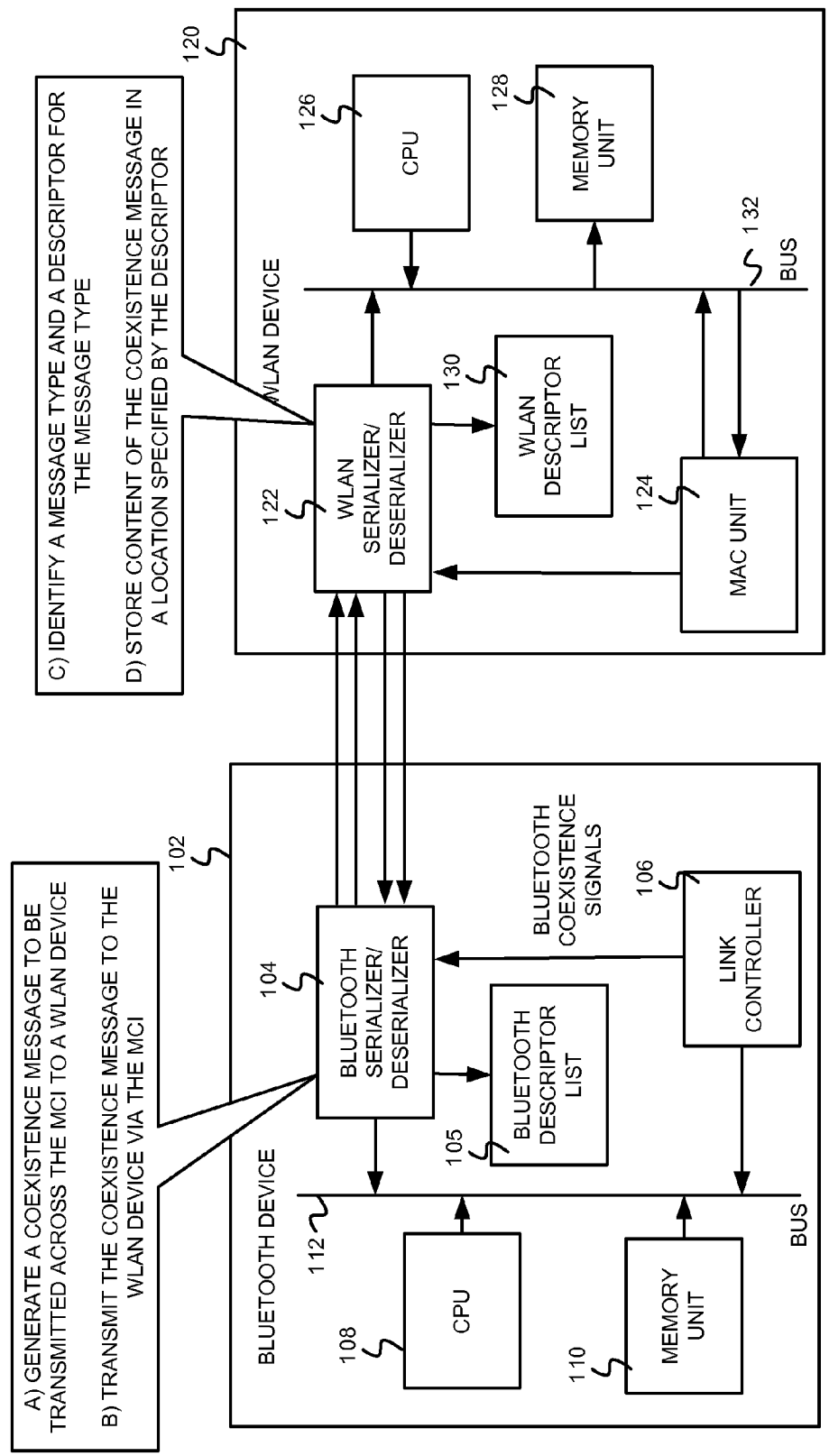
FIG. 1 is an example block diagram illustrating a coexistence mechanism based on a message based coexistence interface.

FIG. 1 is an example block diagram illustrating a coexistence mechanism based on a message-based coexistence interface. FIG. 1 illustrates a Bluetooth device 102 and a WLAN device 120. In some embodiments, the Bluetooth device 102 and the WLAN device 120 may be collocated on a common system (e.g., on the same circuit board, on distinct circuit boards within the same system, etc.). In other embodiments, the Bluetooth device 102 and the WLAN device 120 can be embedded on the same chip (e.g., a system on a chip (SoC), an integrated circuit, etc.) The Bluetooth device 102 comprises a Bluetooth serializer/deserializer 104, a Bluetooth descriptor list 105, a link controller 106, a central processing unit (CPU) 108, and a memory unit 110. The link controller 106 transmits Bluetooth coexistence signals to the Bluetooth serializer/deserializer 104. The Bluetooth serializer/deserializer 104 is coupled with the Bluetooth descriptor list 105. The Bluetooth serializer/deserializer 104, the link controller 106, the CPU 108, and the memory unit 110 communicate via a bus 112. The bus 112 may be an AHB/APB bus. The WLAN unit 120 comprises a WLAN serializer/deserializer 122, a WLAN descriptor list 130, a medium access control (MAC) unit 124, a CPU 126, and a memory unit 128. The WLAN serializer/deserializer 122 is coupled with the WLAN descriptor list 130. The WLAN serializer/deserializer 122, the MAC 124, the CPU 126, and the memory unit 128 communicate via a bus 132. The bus 132 may be an AHB/APB bus. Additionally, the Bluetooth serializer/deserializer 104 is connected to the WLAN serializer/deserializer 122 via four lines. Functionality of the four connection lines will further be described with reference to FIGS. 2A and 2B.

At stage A, the Bluetooth serializer/deserializer 104 generates a coexistence message to be transmitted across the MCI to the WLAN device 120. The Bluetooth serializer/deserializer 104 may generate the coexistence message in response to receiving a trigger or content of the coexistence message. The content of the coexistence message may be received from or triggered by hardware or software. In one implementation, the CPU 108 may transmit a notification to the Bluetooth serializer/deserializer 104 indicating the content of the coexistence message is stored in a specified memory location. The Bluetooth serializer/deserializer 104 may access the specified memory location, retrieve the content of the coexistence message, and generate the coexistence message. In another implementation, the link controller 106 may transmit Bluetooth coexistence signals (e.g., indicating a start and end time of a Bluetooth transmission, a type of Bluetooth packet to be transmitted, etc). The Bluetooth serializer/deserializer 104 may generate the coexistence message based on the Bluetooth coexistence signals from the link controller 106.

Figure 2A:
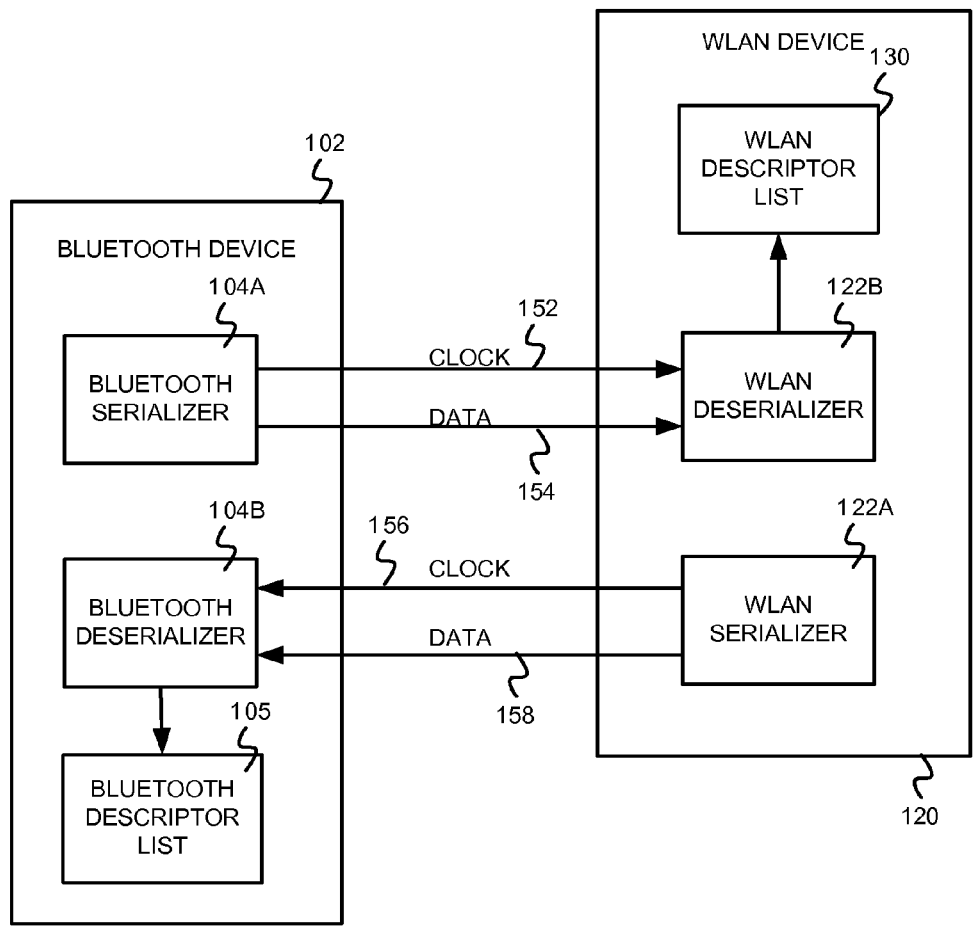
FIG. 2A is a block diagram illustrating an example structure of a Bluetooth serializer/deserializer and a WLAN serializer/deserializer.
Figure 2B:
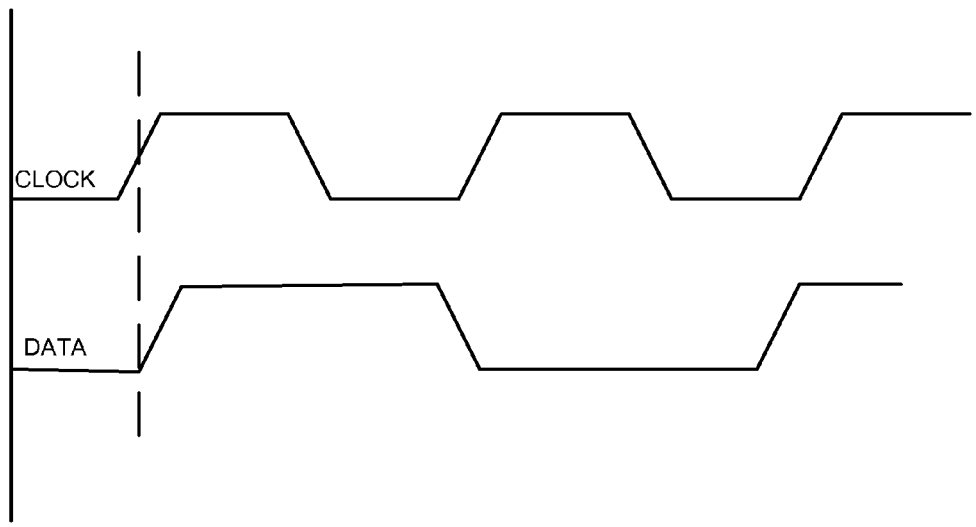
FIG. 2B is a timing diagram illustrating communication between the Bluetooth serializer/deserializer and the WLAN serializer/deserializer.

At stage B, the Bluetooth serializer/deserializer 104 transmits the coexistence message to the WLAN device 120 via the MCI. The Bluetooth serializer/deserializer 104 may transmit the coexistence message via a data line connecting the Bluetooth serializer/deserializer 104 and the WLAN serializer/deserializer 122. Referring to FIG. 2A, the Bluetooth serializer/deserializer 104 comprises a Bluetooth serializer 104A and a Bluetooth deserializer 104B. The Bluetooth deserializer 104B is coupled with the Bluetooth descriptor list 105. Likewise, the WLAN serializer/deserializer 122 comprises a WLAN serializer 122A and a WLAN deserializer 122B. The Bluetooth serializer 104A is connected to the WLAN deserializer 122B by a clock line 152 and a data line 154. Likewise, the WLAN serializer 122A is connected to the Bluetooth deserializer 104B by a clock line 156 and a data line 158. Also, the WLAN deserializer 122B is coupled with the WLAN descriptor list 130. The Bluetooth serializer 104A creates the coexistence message and converts the coexistence message into a serial format so the coexistence message can be transmitted along the data line 154. On the WLAN device 120, the WLAN deserializer 122B receives the coexistence message in a serial format, converts the serial coexistence message into a parallel format, and accordingly processes the coexistence message. Likewise, the WLAN serializer 122A can create a coexistence message and convert the coexistence message into a serial format for transmission along the data line 158. The Bluetooth deserializer 104B can receive the coexistence message in a serial format, converts the serial coexistence message into a parallel format, and accordingly processes the coexistence message. Moreover, the Bluetooth deserializer 104B, in response to receiving a coexistence message from the WLAN serializer 122A, may access the Bluetooth descriptor list 105, to identify one or more descriptors associated with the message type. As indicated in FIG. 2B, data is transmitted along the data line—the data line 154 for communication from the Bluetooth device 102 to the WLAN device 120 and the data line 158 for communication from the WLAN device 120 to the Bluetooth device 102. The clock lines 152 and 156 control data transmission along the data lines 154 and 158 respectively. In some implementations, data is transmitted synchronous to the rising edge of the clock. In some implementations, the clock may be active only while data is being transmitted and may be inactive when no data is being transmitted. However, it should be noted that in some implementations, the signaling could differ. For example, data might be transmitted based on a double data rate (DDR) signaling mechanism with data changing on both the rising and the falling clock edges. In other implementations, the signaling and data transmissions could be spread across a wider bus. In one implementation, the minimum clock frequency during active mode may be 10 MHz, while in other implementations, the clock may be programmed to operate with any suitable clock frequency.

At stage C in FIG. 1, the WLAN serializer/deserializer 122 identifies a message type associated with the coexistence message and a descriptor for the message type. As described earlier, the WLAN deserializer 122B of FIG. 2 receives the coexistence message transmitted by the Bluetooth serializer 104A. The WLAN deserializer 122B can determine the message type associated with the coexistence message by identifying a message tag in a header of the coexistence message. For example, a message tag of 0101 may indicate that the coexistence message comprises scheduling information. The WLAN deserializer 122B also accesses the WLAN descriptor list 130 to identify one or more descriptors associated with the message type. A descriptor may be a software instruction that indicates how the coexistence message should be consumed. The descriptor can indicate how many words of the coexistence message should be decoded, whether the coexistence message was initiated by hardware (e.g., the link controller 106) or software (e.g., the CPU 108), etc. The descriptor may indicate that content of specified fields of the coexistence message should be retrieved. The descriptors may also indicate a location (e.g., in RAM, hardware registers, etc.) where the retrieved content should be stored. The WLAN deserializer 122B may determine a number of descriptors associated with the message type and how the coexistence message should be consumed. The interpretation of the descriptor may depend on the message tag. In other words, the descriptor format may depend on the message tag. Additionally, in some implementations, different message tags may map to the same descriptor. The format and functionality of the descriptors will further be described with reference to FIGS. 6, 7A, and 7B.

At stage D, the WLAN deserializer 122B stores the content of the coexistence message in a location specified by the descriptor. The coexistence message may be consumed either by hardware (e.g., the MAC unit 124) or by software (e.g., the CPU 126). The WLAN deserializer 122B may store content of the coexistence message in a specified location in memory, e.g., random access memory (RAM) or in a specified hardware register. In some implementations, the content of the coexistence message may be store in multiple locations. For example, a received signal strength indicator (RSSI), retrieved from the coexistence message, may be stored in the RAM as well as in a register and multiple components of the WLAN device 120 may access and process the RSSI. The destination of the coexistence message (e.g., whether the coexistence message is stored in hardware registers or in the RAM) may not be controlled by the Bluetooth device 102 but by the WLAN device 120. In some implementations, the Bluetooth device 102 may not be cognizant of how the WLAN device 120 will receive, store, or use the information in the coexistence message. The WLAN deserializer 122B may determine how the coexistence message should be processed based on the capabilities of the WLAN device 120. For example, the WLAN deserializer 122B may store the coexistence message in the MAC 124 if a scheduling table on the WLAN device 120 is implemented in hardware. As another example, the WLAN deserializer 122B may store the coexistence message in the memory unit 128 if the scheduling table on the WLAN device 120 is implemented in software.

It should be noted that although FIGS. 1-2B describe operations of the Bluetooth device 102 creating the coexistence message, transmitting the coexistence message to the WLAN device 120, and the WLAN device 120 processing the coexistence message, in other implementations, the operations might be symmetric. In other words, the WLAN device 120 can create the coexistence message, transmit the coexistence message to the Bluetooth device 102, and the Bluetooth device 102 may process the coexistence message.

Figure 3:
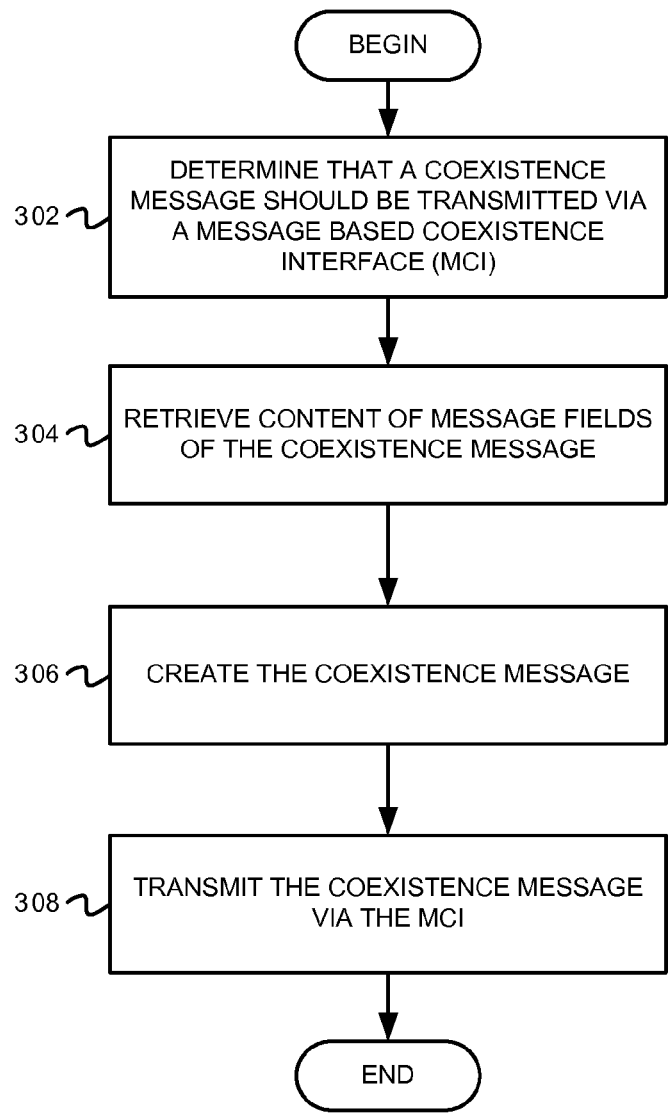
FIG. 3 is a flow diagram illustrating example operations for creating a coexistence message for transmission across a message based coexistence interface.

FIG. 3 is a flow diagram illustrating example operations for creating a coexistence message for transmission across an MCI. Flow 300 begins at block 302.

At block 302, it is determined that the coexistence message should be transmitted via the MCI. For example, the Bluetooth serializer 104A of FIG. 2A may determine that the coexistence message should be transmitted via the MCI in response to receiving a trigger from a link controller 106 or a CPU 108. For example, receiving Bluetooth coexistence information (e.g., Bluetooth link information) from the link controller 106 may serve as a trigger for the Bluetooth serializer 104A. As another example, transmission of the coexistence message may also be triggered in response to receiving a message. As another example, the Bluetooth serializer 104A of FIG. 2A may determine that the coexistence message should be transmitted in response to receiving an indication of change in sleep state from an RTC unit. As another example, the Bluetooth serializer 104A of FIG. 2A may determine that the coexistence message should be transmitted in response to receiving notifications from other processing units (e.g., baseband unit). The flow continues at block 304.

At block 304, content of message fields of the coexistence message is retrieved. In one implementation, the Bluetooth serializer 104A may receive content of the coexistence message from the link controller 106. In another implementation, the CPU 108 may specify one or more memory locations and direct the Bluetooth serializer 104A to retrieve the content of the coexistence message from the memory locations. The Bluetooth serializer 104A may retrieve the content of the coexistence message from the memory locations and create the coexistence message. For example, in accordance with directions from the CPU 108, the Bluetooth serializer 104A may retrieve priority of a Bluetooth transmission from one memory location, a start time of the Bluetooth transmission from a second memory location, and a stop time of the Bluetooth transmission from a third memory location. The Bluetooth serializer 104A may then create the coexistence message comprising the retrieved priority, start time, and stop time. The flow continues at block 306.

At block 306, the coexistence message is created. For example, the Bluetooth serializer 104A may create the coexistence message. As described earlier, the Bluetooth serializer 104A may receive content of the coexistence message from the link controller 106 or may access a memory unit 110 and retrieve the content of the coexistence message. The Bluetooth serializer 104A may create the coexistence message in any suitable format depending on the content of the coexistence message. Example formats of the coexistence message are illustrated in FIGS. 4A, 4B, and 4C.

Figure 4A:
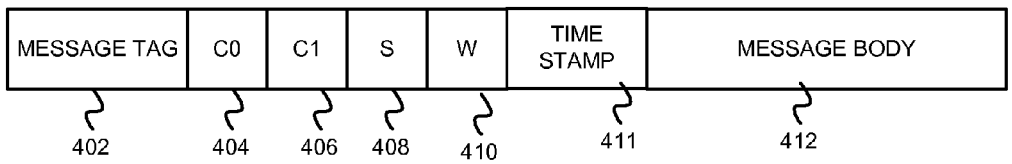
FIG. 4A illustrates an example format of a coexistence message.

FIG. 4A illustrates an example coexistence message format 400. The coexistence message format 400 may be utilized for transmitting general-purpose messages. These messages may be used by software for implementing high-level protocols between the Bluetooth device 102 and the WLAN device 120. The coexistence message 400 comprises a message tag 402, message-type fields C0 404 and C1 406, a sleep status (S) field 408, a wakeup (W) request field 410, a timestamp field 411, and a message body 412. The message tag 402 can indicate the content of the coexistence message. For example, a message tag 402 of 0101 may indicate that the coexistence message comprises scheduling information. In one example, the Bluetooth serializer 104A can set fields {C0, C1} to {0, 0} to indicate that the coexistence message is a general-purpose message. The Bluetooth serializer 104A may indicate the message format using C0 and C1 to enable a WLAN deserializer 122B to accurately process the coexistence message. The sleep status field 406 can indicate a sleep status and the wakeup request field 410 can be used to interrupt and request wakeup if the WLAN device 120 is asleep. The timestamp field 411 can indicate a time instant at which the coexistence message was created. The message body 412 comprises the content of the coexistence message determined at block 304.

Figure 4B:
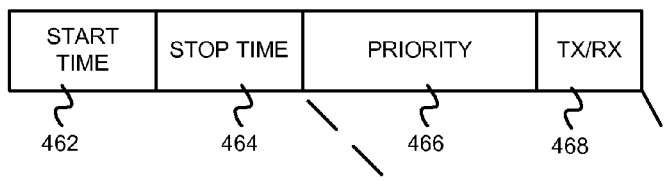
FIG. 4B illustrates a second example format of a coexistence message.
Figure 4B:
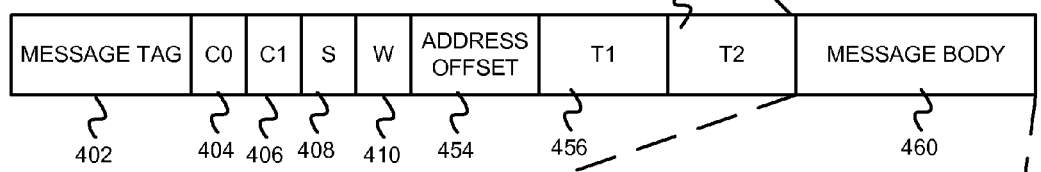
Figure 4B:
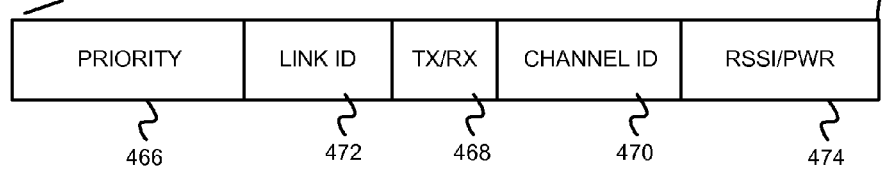

FIG. 4B illustrates another example coexistence message format 450A. The coexistence message format 450A may be utilized for generating scheduling based messages to enable coexistence between the Bluetooth device 102 and the WLAN device 120. In addition to the message tag, {C0, C1}, S, and W fields described with reference to FIG. 4A, the coexistence message 450B also comprises an address offset field 454, two timestamp fields—T1 456 and T2 458, and a message body 460. In the coexistence message 450A, in one example, the fields {C0, C1} may be set to {0, 1} to indicate that the coexistence message is a scheduling-based message. The address offset 454 may be added to a base address of a memory-mapped region specified in a descriptor to identify a location where the message body 460 should be stored. The timestamp fields 456 and 458 may be written to the memory-mapped region after a local timer is added to each of the timestamp fields 456 and 458. Coexistence messages 450B and 450C are examples illustrating use of the scheduling based message format 450A to transmit Bluetooth coexistence information from the Bluetooth device 102 to the WLAN device 120. In the coexistence message 450B, a start time of a Bluetooth communication 462 and a stop time of the Bluetooth communication 464 are transmitted in the timestamp fields 454 and 456 respectively. A priority of the Bluetooth communication 466 and a type of the Bluetooth communication 468 (e.g., whether the communication is a Bluetooth transmission or a Bluetooth reception) are transmitted as part of the message body 460. Likewise, the coexistence message 450C illustrates another embodiment for transmitting Bluetooth coexistence information in the message body 460. In coexistence message 450C, the message body 460 comprises the priority of the Bluetooth communication 466, a link identifier 472, the type of the Bluetooth communication 468, a communication channel identifier 470, and an RSSI value (or transmit power level) 474.

Figure 4C:
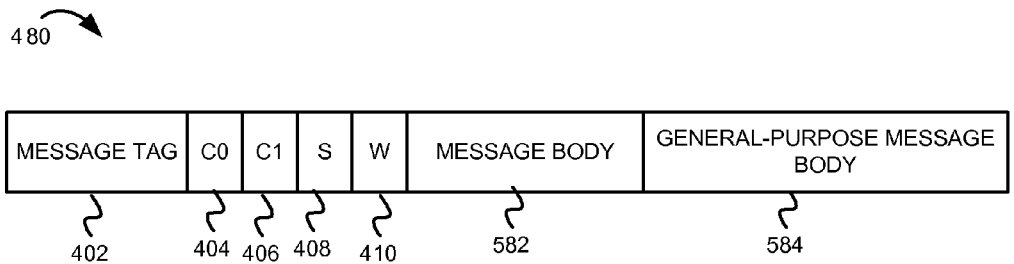
FIG. 4C illustrates a third example format of a coexistence message.

FIG. 4C illustrates another example coexistence message format 480. The coexistence message format 480 may be utilized for transmitting contention-based messages or for transmitting indication of latency sensitive events. In addition to the message tag 402, {C0, C1} 404, 406, S 408, and W 410 fields described with reference to FIG. 4A, the coexistence message format 480 also comprises a message body 582 and a general-purpose message body 584. In the coexistence message format 480, the message body 582 and the software defined general-purpose message body 584 are optional fields. In one example, the fields {C0, C1} when set to {1, 0} may indicate that the coexistence message is a contention-based message without the optional fields 582 and 584. In some implementations, either the message body 582 or the general-purpose message body 584 may be present in the coexistence message represented by message format 480. However, the fields {C0, C1} when set to {1, 1} may indicate that the contention-based message comprises the optional fields 582 and 584. In one example, the message body 582 may comprise 16 bits-8 bits of priority information, 7 bits of channel information, and 1 bit indicating whether the communication is a transmission or a reception. In one implementation, the length of the message body 582 may also be increased in multiples of 32 bits. In some implementations, the message body 582 may be followed by the optional general-purpose message body 584, which was described with reference to FIG. 4A.

It should be noted, however, that other implementations might allow extension of a number of fields of the message formats 400, 450A, and 480, a size of the fields, and a content of the fields while maintaining backward compatibility with older hardware. It should also be noted that some implementations might not use the C0 404, C1 406, S 408, and W 410 fields. Coexistence messages with specified message tags and no message body 582 and 584 might be transmitted to indicate sleep mode, to indicate that the device is awake, or to request wakeup. Referring back to FIG. 3, after the coexistence message is created, the Bluetooth serializer 104A converts the coexistence message into a serial format so that the coexistence message can be transmitted along a single data line (e.g., the data line 154 of FIG. 2A). The flow continues at block 308.

At block 308, the coexistence message is transmitted via the MCI. In one implementation, the Bluetooth serializer 104A may transmit the coexistence message to the WLAN deserializer 122B. In one example, the coexistence message may be transmitted along the data line 154 synchronous to the rising edge of the clock on the clock line 152. From block 308, the flow ends.

Figure 5:
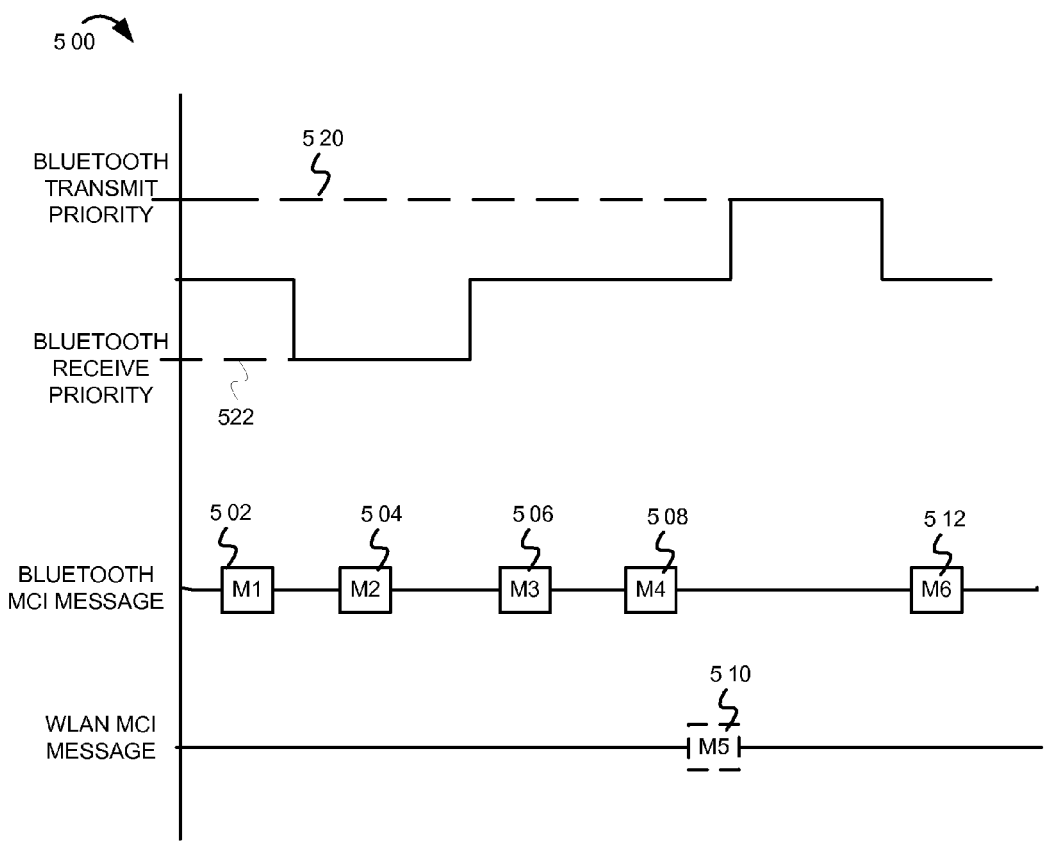
FIG. 5 illustrates an example exchange of various coexistence messages between a Bluetooth device and a WLAN device.

An example of various coexistence messages exchanged between the Bluetooth device 102 and the WLAN device 120 is illustrated in FIG. 5. In FIG. 5, level 520 indicates a priority of a Bluetooth packet transmission, while level 522 indicates a priority of a Bluetooth packet reception. The Bluetooth serializer 104A transmits message 502 to the WLAN device 120. The message 502 can comprise Bluetooth contention information notifying the WLAN device 120 of an expected receive packet. The message 502 can comprise priority of the expected receive packet. After the Bluetooth device 102 receives a header of the receive packet, the Bluetooth serializer 104A transmits message 504. The Bluetooth serializer 104A transmits message 506 after the Bluetooth device 102 receives the receive packet to indicate an end of the Bluetooth packet reception. The Bluetooth serializer 104A transmits message 508 to provide the contention information about an upcoming Bluetooth packet transmission. The WLAN serializer 122A may transmit message 510 if the Bluetooth device 102 is not allowed to initiate the Bluetooth packet transmission. In one implementation, the WLAN serializer 122A may be required to transmit the message 510 a predefined interval before a start time of the Bluetooth packet transmission. In one implementation, if the Bluetooth device 102 receives the message 510 after the start of the Bluetooth packet transmission, the Bluetooth device 102 may abort the Bluetooth packet transmission. The Bluetooth serializer 104A may transmit message 512 to indicate the end of the Bluetooth packet transmission. Messages may be transmitted to indicate a start and end of each packet (e.g., data packets, control packets such as Frequency Hopping Synchronization (FHS) packets and ID packets, etc). The messages may be preserved until wake-up or until they are overwritten with a contention reset message.

Figure 6:
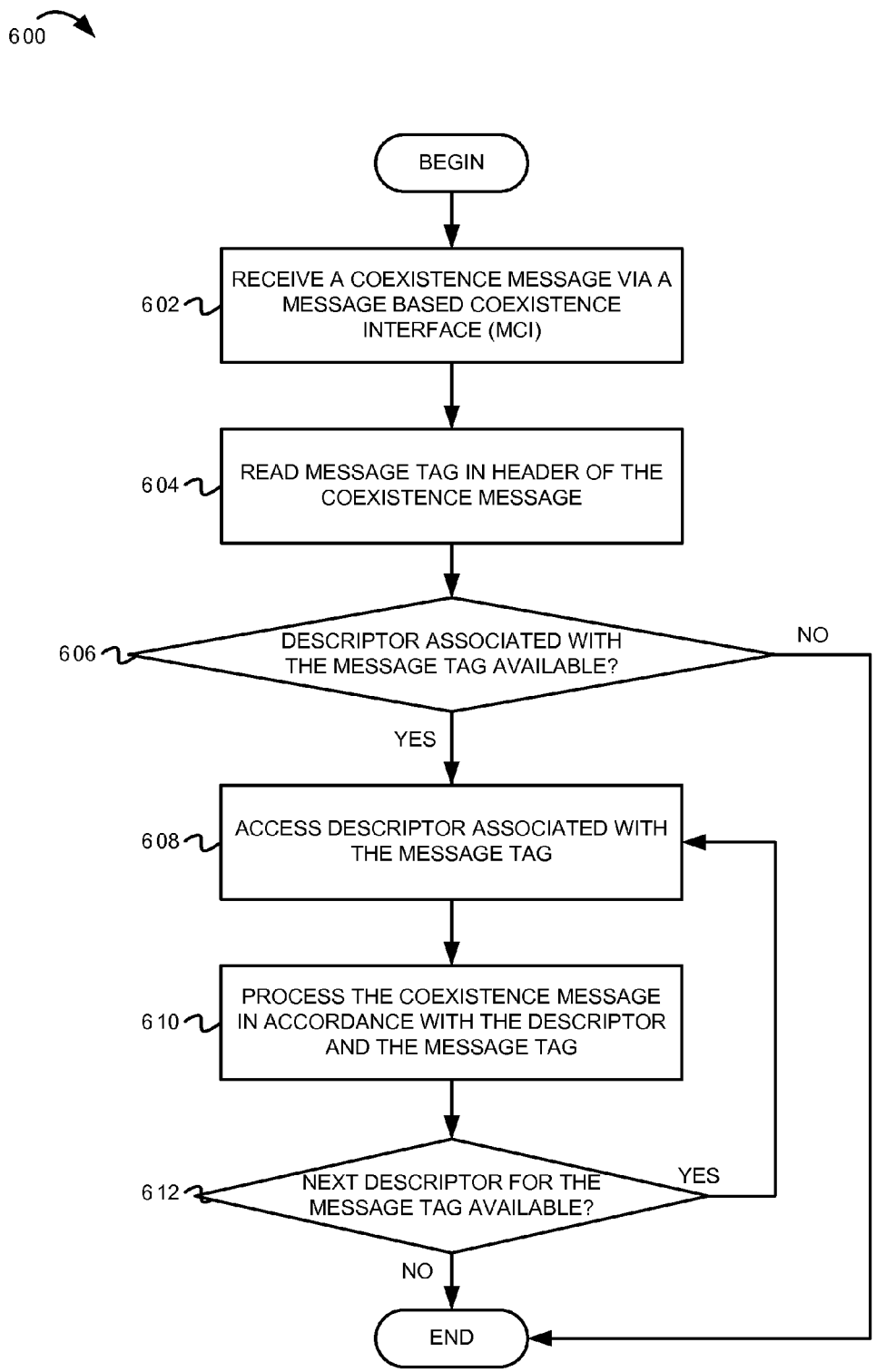
FIG. 6 is a flow diagram illustrating example operations for decoding a coexistence message received via a message based coexistence interface.

FIG. 6 is a flow diagram illustrating example operations for decoding a coexistence message received via a message based coexistence interface (MCI). Flow 600 begins at block 602.

At block 602, the coexistence message is received via the MCI. For example, a WLAN deserializer 122B of FIG. 2A may receive the coexistence message over a data line 154 from a Bluetooth serializer 104A. The flow continues at block 604.

At block 604, a message tag is read from a header of the coexistence message. In one implementation, the WLAN deserializer 122B may read the message tag from the coexistence message. In another implementation, a decoding unit separate from the WLAN deserializer 122B may read the message tag. The message tag can indicate a type and content of the coexistence message. For example, a message tag of 0101 may indicate that the coexistence message comprises scheduling information. As another example, a message tag of 1000 may indicate that the coexistence message comprises a general communication message. As another example, a message tag of 1001 may indicate that the coexistence message comprises low noise amplifier (LNA) gain information. The coexistence message can be in any one of the three formats described with reference to FIGS. 4A, 4B, and 4C. In some implementations, the coexistence message can be in any suitable message format. The flow continues at block 606.

Figure 7A:
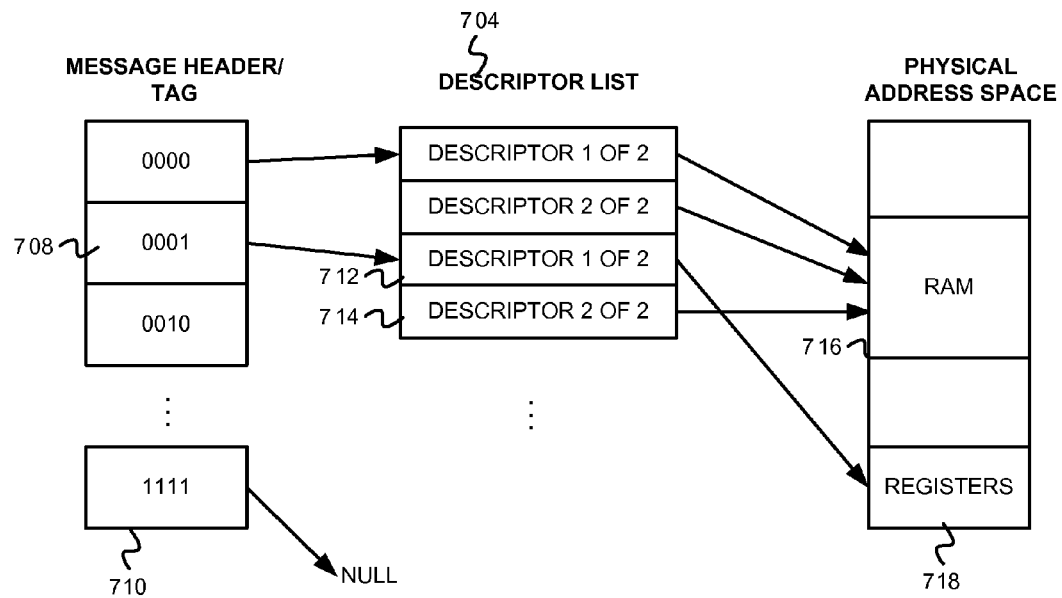
FIG. 7A is a conceptual diagram illustrating identifying and processing a descriptor associated with a message tag.

At block 606, it is determined whether a descriptor associated with the message tag is available. For example, the WLAN deserializer 122B may determine whether the descriptor associated with the message tag is available. In some implementations, the descriptor list 130 may be stored in register space and may be maintained by software. The descriptor may be a software instruction that indicates how the coexistence message should be consumed. Typically, the body of the coexistence message is written to a memory-mapped region in the WLAN device 120. The mapping is defined by the descriptor. For example, the descriptor may indicate that content of specified fields of the coexistence message should be retrieved. The descriptors may also indicate a location where the retrieved content should be stored. The process of identifying the descriptor associated with the message tag is illustrated in FIG. 7A. Availability of the descriptor associated with the message tag may be determined based on determining whether there exists a valid mapping from a table indexed by the messages tags to a descriptor list 704. The descriptor list 704 may be a lookup table comprising message tags and locations of the descriptors associated with the message tags. The message tag from the coexistence message may be used to lookup the WLAN descriptor list 704 to identify the descriptor associated with the message tag. For example, receiving the message tag 708 would trigger a lookup of the descriptor list 704 to determine a mapping for the message tag 708 with contents 0001. It may be determined that the message tag 708 maps to the descriptor 712 in the descriptor list 704. This may indicate that the message with the message tag 0001 will be decoded as dictated by the fields of descriptor 712.

Also, in some implementations, message tags (e.g., the message tag 710) may not be associated with any descriptors. For example, the message tag 710 would trigger a lookup of the descriptor list 704 to determine a mapping for the message tag with contents 1111. The message tag 710 points to NULL and, therefore, it may be determined that a descriptor associated with the message tag 710 is not available. In one implementation, the coexistence message that comprises the message tags that are not associated with descriptors may be discarded. In another implementation, such coexistence messages may be stored in a pre-defined location. Referring back to FIG. 6, if it is determined that the descriptor associated with the message tag is available, the flow continues at block 708. Otherwise, the flow ends.

Figure 7B:
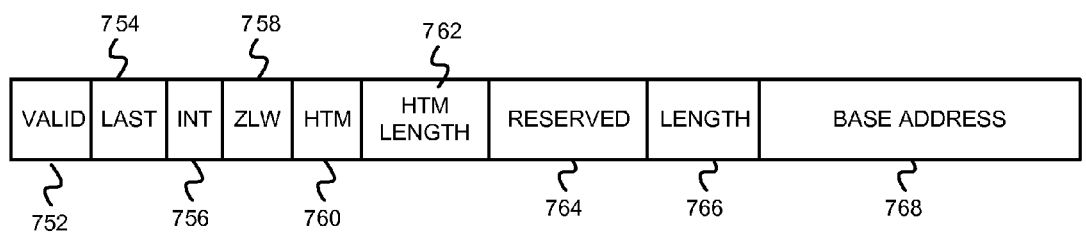
FIG. 7B illustrates an example format of a descriptor associated with a message tag.

At block 608, the descriptor associated with the message tag is accessed. For example, the WLAN deserializer 122B may access, from the WLAN descriptor list 130, the descriptor associated with the message tag. In some implementations, the WLAN deserializer 122B may determine a memory location of the descriptor from the WLAN descriptor list 130 and access descriptor from the memory location. An example format of the descriptor is illustrated in FIG. 7B. The descriptor 750 comprises a "valid" field 752, a "last" field 754, a "interrupt" field 756, a "zero length write (ZLW)" field 760, a 'hardware triggered message (HTM)" field 762, an "HTM length" field 764, a reserved field 764, a "length" field 766, and a "base address" field 768.

The "valid" field 752 comprises one bit and indicates whether or not the descriptor and its fields are valid. In some implementations, the descriptor may be invalid if the valid field 752 is set to "0". The remainder of the coexistence message after the last valid descriptor is discarded. The "last" field 754 comprises one bit and indicates whether or not the descriptor is a last descriptor associated with the message tag. The message tag and hence the coexistence message may be associated with more than one descriptor. The descriptor list 130 of FIG. 1 may reference a first descriptor associated with the message tag, the first descriptor may implicitly reference a second descriptor associated with the message tag, and so on. This can indicate that consecutive descriptors from the descriptor list 704 are used until a descriptor with the "last" bit set (e.g., last bit=1) is encountered. As illustrated in FIG. 7A, the message tag 708 references the descriptor 712. The descriptor 712 implicitly references the descriptor 714, which is also associated with the message tag 708. The "last" field 754 in the descriptor 714 may be set to "1", to indicate that the descriptor 714 is the last descriptor in a descriptor chain associated with the message tag 708.

The "interrupt" field 756 comprises one bit and causes an interrupt to be triggered when the interrupt field 756 is set to "1". The content of the interrupt field 756 should be identical for all descriptors associated with a particular message tag. The ZLW field 758 comprises one bit and indicates that a write to the base address 768 should be generated even if the length field 766 is zero. A pre-defined set of characters may be written to the base address 768 if the length field 766 is zero.

The HTM field 760 comprises one bit and indicates that the descriptor should be used for receiving hardware-triggered messages. In some implementations, the HTM length field 762 may be valid only if the HTM field 760 is set (i.e., HTM=1). The HTM length field 762 can indicate a length (in bytes) of the body of the hardware triggered messages that the WLAN deserializer 122B should decode before accessing a next descriptor associated with the message tag.

The length field 766 indicates a number of 32 bit words of the coexistence message to be written to a physical address space (indicated by the base address field 768) before accessing the next descriptor associated with the message tag. When the HTM field 760 is set, the length field 766 should be less than or equal to the HTM length field 762. The base address field 768 specifies a physical base address starting from which all/part of the coexistence message body is written to the physical address space. An address offset if specified in the coexistence message (e.g., the address offset 454 of FIG. 4B) may be added to the base address field 768 to generate the physical base address.

It should be noted that the descriptor format of FIG. 7B is an example descriptor format. Descriptors may be in any suitable format depending on the message tags associated with the descriptors. For example, a descriptor format might consist of one 32-bit base address. The base address, if set to 0, might indicate that the "valid" field is 0. The base address, if not equal to zero, might implicitly indicate certain other predefined values (e.g., the "valid" field might be set to 1, the "last" field might be 1, the "INT" field might be set to 1, the "ZLW" and "HTM Length" fields may be ignored, the "HTM" field might be set to 0, and the "Length" field might be set to 4). As another example, a descriptor format might consist of one "valid" bit, with other fields assuming pre-defined values. In other words, a set of one or more message tags may be allocated to different descriptor formats. For example, a first set of message tags may be decoded using descriptors in the descriptor format of FIG. 7B. A second set of message tags may be decoded using descriptors in a different descriptor format. Referring back to FIG. 6, after the descriptor associated with the message tag is accessed, the flow continues at block 610.

At block 610, the coexistence message is processed in accordance with the descriptor and the message tag. As described with reference to FIG. 608, different message tags may be associated with different descriptor formats. Therefore, the descriptor in conjunction with the message tag may determine how the coexistence message will be processed. The message tag can indicate which format of the descriptor should be used and also which descriptor (from the descriptor list 704) should be used to decode the coexistence message. For example, the WLAN deserializer 122B may retrieve all/part of the coexistence message body as indicated by the descriptor and store the retrieved part of the coexistence message body. Referring to FIG. 7A, the descriptor 712 associated with the message tag 708 may indicate (e.g., in the length field 766 of FIG. 7B) that e.g., a first set of three 32-bit words of the coexistence message comprising the message tag 708 should be stored in a register in the register space 718. The descriptor 714 associated with the message tag 708 may indicate that the remainder of the coexistence message comprising the message tag 708 should be stored in memory location 5000 in RAM 716.

Typically, the Bluetooth device 102 might not determine how the WLAN deserializer 122B will receive, store, or use the information in the coexistence message. The WLAN deserializer 122B may determine how the coexistence message should be processed based on the capabilities of the WLAN device 120. As an example, the WLAN deserializer 122B may receive the coexistence message in the message format 450C of FIG. 4B, and may store various fields (e.g., priority 466, channel ID 470, etc.) at various memory locations depending on the content of the descriptors associated with a message tag of the coexistence message. The coexistence message may comprise an address offset field 454 that defines a location of scheduling information in a coexistence scheduling table maintained by the WLAN device 120. The timestamps 456 and 458 may indicate a start time and a stop time of a Bluetooth packet communication, respectively, and may also be stored in the location indicated by the address offset field 454 and by the descriptor associated with a message tag of the scheduling information message.

In some implementations, the WLAN deserializer 122B may store part/all of the coexistence message in various locations as indicated by the descriptors associated with the message tag in the coexistence message. As mentioned earlier, the descriptors associated with the message tag may be platform-dependent. The descriptors may indicate a location where the content of the coexistence message should be stored based on content of the coexistence message (e.g., indicated by the message tag and the fields {C0, C1}). For example, the message tag may be associated with only one descriptor that indicates that priority information in the coexistence message should be stored in the RAM. As another example, the message tag may be associated with two descriptors—one descriptor may indicate that RSSI information in the coexistence message should be stored in a specified location in the RAM to be consumed by software, and another descriptor may indicate that the RSSI information should be stored in a specified register to be consumed by a state machine. A coexistence agent or other processing unit may access the memory location (or the register), retrieve, and accordingly process the RSSI information. In another implementation, the memory location or register in which the content of the coexistence message is stored, as indicated by the descriptors, may be a location of the scheduling table. In other words, the WLAN deserializer 122B may directly populate the scheduling table in accordance with the descriptors. For example, the WLAN deserializer 122B may map the coexistence message to software (e.g., RAM) if the WLAN device 120 comprises a software-implemented scheduling table. WLAN firmware may interpret the coexistence message while scheduling WLAN transmit and receive operations. As another example, the WLAN deserializer 122B may map the coexistence message to hardware (e.g., MAC) based scheduling table. The MAC can analyze the coexistence message and schedule WLAN communications according so as to avoid interference with Bluetooth communications. After the WLAN deserializer 122B processes the coexistence message in accordance with the descriptor, the flow continues at block 612.

At block 612, it is determined whether a next descriptor associated with the message tag is available. For example, the WLAN deserializer 122B may access the WLAN descriptor list 130 to determine whether the next descriptor associated with the message tag is available. The WLAN deserializer 122B may read the last field 754 of FIG. 7B of a current descriptor to determine whether the current descriptor is the last descriptor associated with the message tag. If the last field 754 in the current descriptor is set to "0", the WLAN deserializer 122B may identify the next descriptor associated with the message tag. If it is determined that the next descriptor associated with the message tag is available, the flow continues at block 608 where the next descriptor is accessed and the coexistence message is processed in accordance with the next descriptor. The process continues for each descriptor associated with the message tag. The flow ends after it is determined that the current descriptor associated with the message tag is not available (e.g., based on determining that the "last" bit in the descriptor is set).

It should be understood that the depicted flow diagrams (FIGS. 3 and 6) are examples meant to aid in understanding embodiments and should not be used to limit embodiments or limit scope of the claims. Embodiments may perform additional operations, fewer operations, operations in a different order, operations in parallel, and some operations differently. For example, although FIG. 7A depicts each message tag being associated with two descriptors, the message tag can be associated with any suitable number of descriptors. A message tag may be associated with a single descriptor or more than two descriptors. In some implementations, the message tag may not be associated with any descriptors. Also, although examples refer to exchange of coexistence messages from the Bluetooth device 102 to the WLAN device 120, coexistence messages may also be transmitted from the WLAN device 120 to the Bluetooth device 102. For example, the WLAN serializer 122A of FIG. 2A may transmit the coexistence messages to the Bluetooth deserializer 104B. The WLAN serializer 104A can transmit coexistence scheduling information and information about currently received WLAN packets to the Bluetooth deserializer 104B, which in turn can transmit the WLAN scheduling information to a Bluetooth scheduler.

Also, although FIGS. 1-7 describe using the MCI and the coexistence messages to exchange coexistence information between the Bluetooth device 102 and the WLAN device 120, in some implementations the MCI and the coexistence messages may not be used to enable coexistence. In other words, the MCI may be used for applications beyond coexistence.

In some implementations, the Bluetooth device 102 and the WLAN device 120 may use the MCI to share a front end, share an antenna, share a receive panel, etc. For example, while sharing a receive panel, the Bluetooth device 102 and the WLAN device 120 may need to communicate their differences in modulation, receive signal strength, etc. to ensure that received signals do not get saturated or fall below threshold RSSI values. If the Bluetooth device 102 is receiving a Bluetooth packet, the Bluetooth device 102 can indicate that the WLAN device 120 should not start receiving a WLAN packet. As another example, the MCI may be used for exchange of debugging information between the Bluetooth device 102 and the WLAN device 120 or between either Bluetooth device 102 or the WLAN device 120 and an external debugging tool. As another example, the Bluetooth device 102 may transmit data, for further processing, to the WLAN device 120 via the MCI. The WLAN device can, in turn, transmit the data received from the Bluetooth device 102 to a host device via a secure digital input output (SDIO), a serial peripheral interface (SPI), a peripheral component interconnect (PCI) bus, PCI-Express (PCI-E) bus or other host interface on the WLAN device 120. As another example, a processing unit may be located only on the WLAN device 120. Bluetooth data to be processed may be transmitted from the Bluetooth device 102 to the WLAN device 120 via the MCI.

It should also be noted that although FIG. 1 depicts the serializer/deserializer units 104 and 122 connected respectively to the link controller 106 and the MAC unit 124, in some implementations, the serializer/deserializer units 104 and 122 might be connected to other components of the Bluetooth device 102 and the WLAN device 120 respectively. For example, a real time clock (RTC) unit (on either the Bluetooth device 102 or the WLAN device 120) may generate a sleep state signal to indicate, respectively to the serializer/deserializer units 104 and 122, changes in sleep state. The sleep state signal may trigger transmission of an MCI message. As another example, the serializer/deserializer units 104 and 122 may be connected to a baseband processing unit. Additionally, although FIGS. 1-7 describe operations of the Bluetooth device 102 creating the coexistence message and the WLAN device 120 processing the coexistence message, in other implementations, the WLAN device 120 can create the coexistence message and the Bluetooth device 102 may process the coexistence message.

Lastly, it should also be noted that when the WLAN device 120 is in an inactive state (i.e., sleep mode), the Bluetooth device 102 might continue to transmit coexistence messages to the WLAN device 120. In other implementations, however, the Bluetooth device 102 may transmit only select messages when the WLAN device 120 is in the inactive state. The WLAN device 120 may not react to the coexistence messages while the WLAN device 120 is in the inactive state, but may process the coexistence messages once the WLAN device 120 returns to an active state. In other implementations, however, the WLAN device 120 may process some coexistence messages while in the inactive state, and ignore other coexistence messages or process the other coexistence messages on returning to the active state. Likewise, the WLAN device 120 may also transmit coexistence message to the Bluetooth device 102, while the Bluetooth device is in the inactive state. In one example, the WLAN device 120 may preserve a contention information message received from the Bluetooth device 102 while the WLAN device is in the inactive state. On returning to the active state, the WLAN device 120 may analyze the contention information message to determine a Bluetooth communication schedule.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 8:
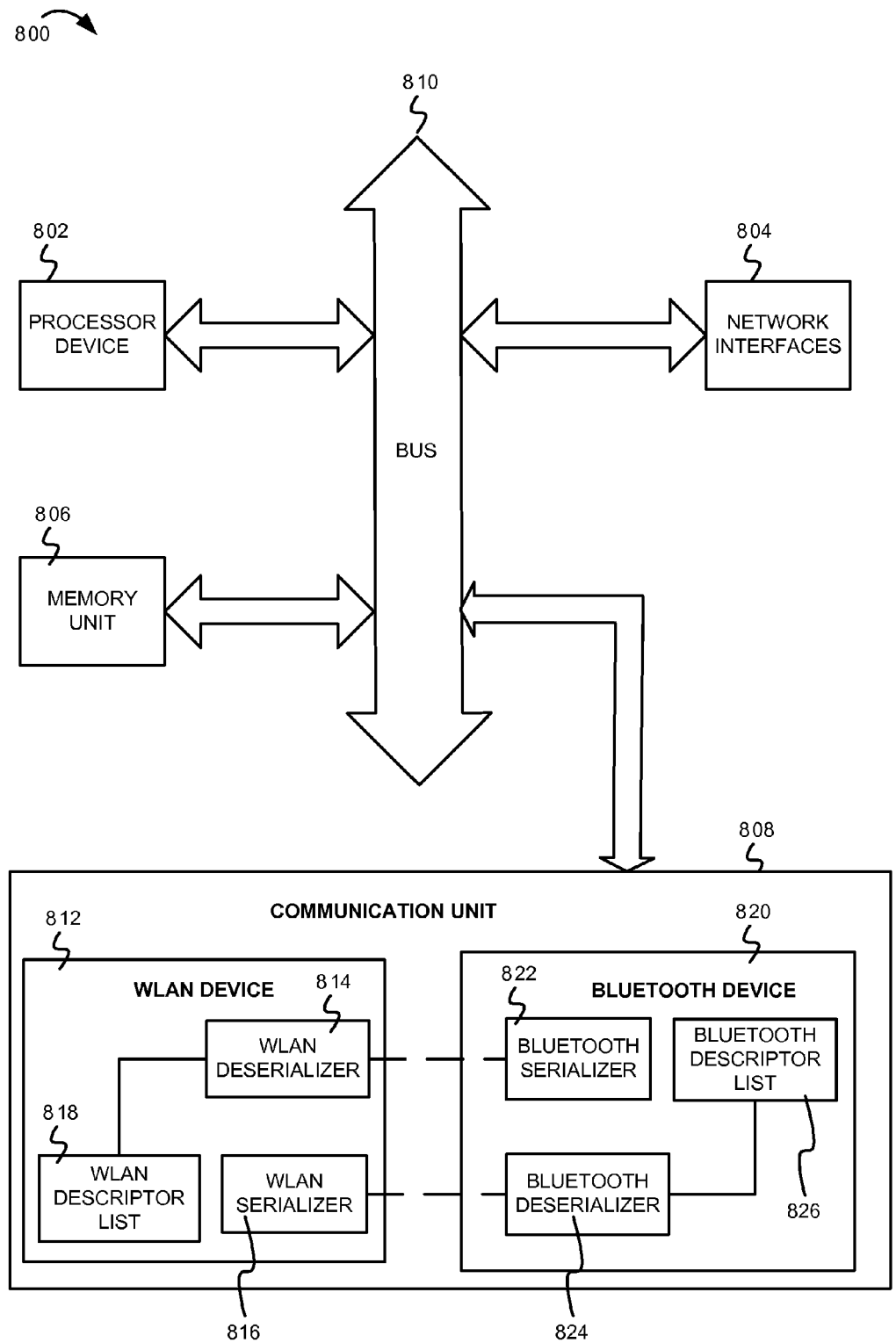
FIG. 8 is a block diagram of one embodiment of a computer system including a message based coexistence mechanism for Bluetooth and WLAN devices.

FIG. 8 is a block diagram of one embodiment of a computer system including a message based coexistence mechanism for Bluetooth and WLAN devices. In some implementations, the computer system 800 may be one of a personal computer (PC), a laptop, a netbook, a mobile phone, a personal digital assistant (PDA), or other electronic systems comprising a collocated Bluetooth device and a WLAN device. The computer system 800 includes a processor unit 802 (possibly including multiple processors, multiple cores, multiple nodes, and/or implementing multi-threading, etc.). The computer system 800 includes a memory unit 806. The memory unit 806 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 800 also includes a bus 810 (e.g., PCI, ISA, PCI-Express, HyperTransport®, Infini-Band®, NuBus, AHB, AXI, etc.), and network interfaces 804 that include at least one wireless network interface (e.g., a WLAN interface, a Bluetooth® interface, a WiMAX interface, a ZigBee° interface, a Wireless USB interface, etc.).

The computer system 800 also includes a communication unit 808. The communication unit 808 comprises a Bluetooth device 820 coupled with a WLAN device 812 via a message based coexistence interface (MCI). The WLAN device 812 comprises a WLAN deserializer 814, a WLAN serializer 816, and a WLAN descriptor list 818. The WLAN deserializer 814 is coupled with the WLAN descriptor list 818. The Bluetooth device 820 comprises a Bluetooth serializer 822, a Bluetooth deserializer 824, and a Bluetooth descriptor list 826. The Bluetooth deserializer 824 is coupled to the Bluetooth descriptor list 826. The WLAN serializer 816 may transmit coexistence messages to the Bluetooth deserializer 824 via the MCI. Likewise, the Bluetooth serializer 822 may also transmit coexistence messages to the WLAN deserializer 814 via the MCI. The WLAN deserializer 814 can receive the coexistence messages and process and store content of the coexistence message in accordance with descriptors in the descriptor list 818 as described with reference to FIGS. 1-7.

While the embodiments are described with reference to various implementations and exploitations, it will be understood that these embodiments are illustrative and that the scope of the inventive subject matter is not limited to them. In general, techniques for a message based coexistence mechanism as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
receiving, from a first wireless network device of a communication system at a second wireless network device of the communication system, a coexistence message across a message based coexistence interface between the first wireless network device and the second wireless network device, the first wireless network device and the second wireless network device associated with different wireless technologies, wherein the coexistence message is associated with a high-level protocol between the first wireless network device and the second wireless network device, and wherein the coexistence message includes coexistence information and a message tag;
determining whether a descriptor associated with the message tag is available in a descriptor list stored at the second wireless network device, wherein the descriptor indicates how the coexistence message should be processed by the second wireless network device; and
processing, at the second wireless network device, the coexistence message in accordance with the descriptor, in response to determining that the descriptor associated with the message tag is available.

2. The method of claim 1, wherein the descriptor indicates at least one of a segment of the coexistence message that should be decoded, whether the coexistence message was initiated by hardware or software, where the segment of the coexistence message should be stored, whether there exist additional descriptors associated with the message tag, whether the descriptor is valid, and whether an interrupt should be triggered.

3. The method of claim 1, wherein said processing the coexistence message in accordance with the descriptor comprises:
reading a first field in the descriptor associated with the message tag;
processing at least a part of the coexistence message in accordance with the descriptor in response to determining a first value of the first field in the descriptor, wherein the first value of the first field indicates that the descriptor is valid; and
discarding at least the part of the coexistence message in response to determining a second value of the first field in the descriptor, wherein the second value of the first field indicates that the descriptor is not valid.

4. The method of claim 1, wherein said processing the coexistence message in accordance with the descriptor comprises at least one of storing at least a part of the coexistence information in a location indicated in the descriptor and decoding the at least a part of the coexistence information.

5. The method of claim 4, wherein said storing at least the part of the coexistence information in the location indicated in the descriptor further comprises one or more of storing the at least the part of the coexistence information in random access memory and storing the at least the part of the coexistence information in a hardware register.

6. The method of claim 1, further comprising, in response to determining that the descriptor associated with the message tag is not available, discarding the coexistence message.

7. The method of claim 1, wherein the first wireless network device is a short range wireless communication device and the second wireless network device is a wireless local area network (WLAN) device.

8. The method of claim 1, wherein the coexistence message comprises at least one of the message tag, a message type, a sleep mode status, a wake-up status, an address offset for calculating a destination address of the coexistence message, timestamp fields, and a message body.

9. The method of claim 8, wherein the message type indicates one of a general-purpose message, a scheduling based message, and a contention based message.

10. The method of claim 8, wherein the timestamp fields indicate a start time of a communication of the first wireless network device and a stop time of the communication of the first wireless network device.

11. The method of claim 8, wherein the message body comprises at least one of priority of a communication of the first wireless network device, a power indicator of the communication, whether the communication is a transmission or a reception, a communication channel identifier, and a communication link identifier.

12. The method of claim 1, wherein said processing the coexistence message in accordance with the descriptor comprises:
determining that a second descriptor associated with the message tag is available in the descriptor list; and
further processing at least a part of the coexistence information in accordance with the second descriptor.

13. The method of claim 1, further comprising transmitting messages via the message based coexistence interface to transfer of one of debugging information, data to be processed, and contention information for sharing components between the first and the second wireless network devices.

14. A wireless communication system comprising:
a first wireless network device operable to generate a coexistence message; and
a second wireless network device associated with a different wireless technology than the first wireless network device, the second wireless network device operable to:
receive the coexistence message from the first wireless network device of the wireless communication system across a message based coexistence interface between the first wireless network device and the second wireless network device, wherein the coexistence message is associated with a high-level protocol between the first wireless network device and the second wireless network device, and wherein the coexistence message includes coexistence information and a message tag;
determine whether a descriptor associated with the message tag is available in a descriptor list stored at the second wireless network device, wherein the descriptor indicates how the coexistence message should be processed; and
process the coexistence message in accordance with the descriptor, in response to determining that the descriptor associated with the message tag is available.

15. The wireless communication system of claim 14, wherein the second wireless network device operable to process the coexistence message in accordance with the descriptor comprises at least one of the second wireless network device operable to store at least a part of the coexistence information in a location indicated in the descriptor and the second wireless network device operable to decode the at least a part of the coexistence information.

16. The wireless communication system of claim 14, wherein the descriptor indicates at least one of a segment of the coexistence message that should be decoded, whether the coexistence message was initiated by hardware or software, where the segment of the coexistence message should be stored, whether there exist additional descriptors associated with the message tag, whether the descriptor is valid, and whether an interrupt should be triggered.

17. The wireless communication system of claim 14, wherein the coexistence message comprises at least one of the message tag, a message type, a sleep mode status, a wake-up status, an address offset for calculating a destination address of the coexistence message, timestamp fields, and a message body.

18. The wireless communication system of claim 14, wherein the second wireless network device operable to process the coexistence message in accordance with the descriptor comprises the second wireless network device operable to:
   read a first field in the descriptor associated with the message tag;
   process at least a part of the coexistence message in accordance with the descriptor in response to determining a first value of the first field in the descriptor, wherein the first value of the first field indicates that the descriptor is valid; and
   discard at least the part of the coexistence message in response to determining a second value of the first field in the descriptor, wherein the second value of the first field indicates that the descriptor is not valid.

19. The wireless communication system of claim 14, wherein the second wireless network device operable to process the coexistence message in accordance with the descriptor comprises the second wireless network device operable to:
   determine that a second descriptor associated with the message tag is available in the descriptor list; and
   further process at least a part of the coexistence information in accordance with the second descriptor.

20. The wireless communication system of claim 14, further comprising the second wireless network device operable to transmit messages via the message based coexistence interface to transfer of one of debugging information, data to be processed, and contention information for sharing components between the first wireless network device and the second wireless network device.

21. One or more non-transitory machine-readable media having stored therein instructions, which when executed a set of one or more processor units causes the set of one or more processor units to perform operations that comprise:
   determining a message tag included in a coexistence message received from a first wireless network device of a communication system across a message based coexistence interface at a second wireless network device, wherein the coexistence message is associated with a high-level protocol between the first wireless network device and the second wireless network device, and wherein the coexistence message includes coexistence information and a message tag;
   determining whether a descriptor associated with the message tag is available in a descriptor list stored at the second wireless network device, wherein the descriptor indicates how the coexistence message should be processed; and
   processing the coexistence message in accordance with the descriptor, in response to determining that the descriptor associated with the message tag is available.

22. The non-transitory machine-readable media of claim 21, wherein said operation of processing the coexistence message in accordance with the descriptor and the message tag comprises:
   identifying that a second descriptor associated with the message tag is available in the descriptor list; and
   further processing at least a part of the coexistence information in accordance with the second descriptor.

23. A method comprising:
   detecting, at a first wireless network device of a communication system, a trigger for creating a coexistence message to a second wireless network device of the communication system;
   preparing the coexistence message, the coexistence message is associated with a high-level protocol between the first wireless network device and the second wireless network device, wherein the coexistence message includes coexistence information and a message tag associated with at least one descriptor stored in a descriptor list at the second wireless network device; and
   sending, to the second wireless network device, the coexistence message across a message based coexistence interface between the first wireless network device and the second wireless network device of the communication system.

24. The method of claim 23, wherein said detecting the trigger for creating the coexistence message at the first wireless network device comprises one of receiving a software trigger from a processing unit on the first wireless network device indicating at least one memory location from where the content of the coexistence message should be retrieved and receiving the content of the coexistence message from a hardware component of the first wireless network device.

25. The method of claim 1, wherein said processing the coexistence message includes processing the coexistence message in accordance with multiple descriptors associated with the message tag, each of the multiple descriptors including an indicator whether that descriptor is a last descriptor associated with the message tag.

26. The method of claim 1, wherein the descriptor list stored at the second wireless network device includes a plurality of descriptors defining formats of associated with various message tags.

27. The method of claim 1, wherein the descriptor identifies at least one field of the coexistence message.

28. The method of claim 27, wherein the descriptor indicates a memory location for the field of the coexistence message based on the coexistence message being stored in a memory-mapped region in the second wireless network device.

* * * * *